United States Patent
Kaneko et al.

(10) Patent No.: US 8,751,660 B2
(45) Date of Patent: Jun. 10, 2014

(54) APPARATUS AND A METHOD FOR DISTRIBUTING LOAD, AND A NON-TRANSITORY COMPUTER READABLE MEDIUM THEREOF

(75) Inventors: Yu Kaneko, Kanagawa (JP); Shigeo Matsuzawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 13/485,987

(22) Filed: Jun. 1, 2012

(65) Prior Publication Data
US 2012/0311158 A1 Dec. 6, 2012

(30) Foreign Application Priority Data
Jun. 2, 2011 (JP) ................. P2011-124411

(51) Int. Cl.
*G06F 15/16* (2006.01)
(52) U.S. Cl.
USPC ............ 709/226; 709/224; 700/291; 713/320
(58) Field of Classification Search
USPC .......... 709/200–203, 217–227, 228; 702/1, 3, 702/60, 61, 62; 703/21; 700/291; 713/300, 713/320
See application file for complete search history.

(56) References Cited

U.S. PATENT DOCUMENTS

| | | | | |
|---|---|---|---|---|
| 7,127,625 B2 * | 10/2006 | Farkas et al. | ................. | 713/320 |
| 8,271,643 B2 * | 9/2012 | Barnett et al. | ................. | 709/224 |
| 2005/0055590 A1 * | 3/2005 | Farkas et al. | ................. | 713/320 |
| 2012/0030356 A1 * | 2/2012 | Fletcher | ........................ | 709/226 |
| 2012/0053925 A1 * | 3/2012 | Geffin et al. | ..................... | 703/21 |
| 2012/0084583 A1 * | 4/2012 | Chen et al. | ..................... | 713/320 |
| 2012/0239323 A1 * | 9/2012 | McGrane et al. | ............... | 702/62 |
| 2013/0231791 A1 * | 9/2013 | Jacobs | .......................... | 700/291 |

FOREIGN PATENT DOCUMENTS

JP 2005-004676 1/2005

OTHER PUBLICATIONS

Katano et al., "A Static Scheduling Scheme of Task Network on Heterogeneous Environment", *IPSJ SIG Technical Report*, 2007(80), pp. 37-42.

* cited by examiner

*Primary Examiner* — Moustafa M Meky
(74) *Attorney, Agent, or Firm* — Nixon & Vanderhye, P.C.

(57) ABSTRACT

According to one embodiment, a load distribution apparatus includes a receiving unit, an acquisition unit, an estimation unit, and a selection unit. The receiving unit is configured to receive a program of an energy saving service from a service provider. The acquisition unit is configured to acquire an external information related to the energy saving service. The estimation unit is configured to estimate a resource consumption of respective computer resources of a plurality of servers to execute the program based on the external information. The selection unit is configured to select at least one server to be provided with the program from the plurality of servers based on the resource consumption.

10 Claims, 20 Drawing Sheets

| JOB NUMBER | TYPE | PATH | DATA |
|---|---|---|---|
| 1 | C | /job/1/a.out | data.txt |
| 2 | Java | /job/2/ControlAC.jar | ac.properties |
| 3 | Bash | /job/3/OnOffLight.sh | parameter.def |

FIG. 2

| JOB NUMBER | EXECUTION TIME | REPEAT EXECUTION | REPEAT INTERVAL | CPU OCCUPATION TIME | MEMORY CONSUMPTION | NETWORK TRAFFIC | DISK CONSUMPTION |
|---|---|---|---|---|---|---|---|
| 1 | 2011-01-01 00:00:00 | true | 10min | 10s | 10MB | 40KB/80KB | 100KB |
| 2 | 2011-01-01 01:00:00 | true | 1hour | 1m | 100KB | 10MB/5MB | 20KB |
| 3 | 2011-01-01 01:00:00 ~ 2011-01-01 01:10:00 | false | | 1hour | 1GB | 1KB/10KB | 1MB |

FIG. 3

| EQUATION NUMBER | EXTERNAL INFORMATION ID | ACQUISITION METHOD | OPERATOR | COMPARISON VALUE | NOTE |
|---|---|---|---|---|---|
| EQUATION 1 | http://weather.sample/tokyo/temperature5 | HTTP | = | TEN MINUTES BEFORE | http-proxy |
| EQUATION 2 | http://weather.sample/tokyo/sunshine1 | SQL | != | TEN MINUTES BEFORE | user:password |
| EQUATION 3 | http://energy.sample/energy-price | SOAP | > | 20YEN/kWh | EPR |
| EQUATION 4 | http://server.sample/srv-price | SOAP | > | 100YEN/h | EPR |

FIG. 4

| JOB NUMBER | REQUIRED CONDITION | VARIATION OF CPU OCCUPATION TIME | VARIATION OF MEMORY CONSUMPTION | VARIATION OF NETWORK TRAFFIC | VARIATION OF DISK CONSUMPTION |
|---|---|---|---|---|---|
| 1 | EQUATION 1 | −5s | −3MB | −10KB/−40KB | −50KB |
| 2 | EQUATION 2 AND 3 | +1m | +100KB | +2MB/+1MB | +30KB |
| 3 | EQUATION 4 | +1m | +100KB | +2MB/+1MB | +30KB |

FIG. 5

| TIME | EXECUTION JOB NUMBER |
|---|---|
| 2011-01-01 00:00:00 | 1 |
| 2011-01-01 00:01:00 | 5,9 |
| 2011-01-01 00:02:00 | 8 |
| ⋮ | ⋮ |
| 2011-01-01 00:10:00 | 1 |
| ⋮ | ⋮ |
| 2011-01-01 11:59:00 | |

FIG. 6

| JOB EXECUTION-SERVER NUMBER | ADDRESS | TIME STAMP | CPU USAGE RATIO | MEMORY CONSUMPTION | NETWORK TRAFFIC | DISK CONSUMPTION | JOB NUMBER IN EXECUTING |
|---|---|---|---|---|---|---|---|
| 1 | 192.168.0.5 | 2011-01-01 00:00:11 | 60% | 5.2GB | 523KB/2MB | 153.8GB | 1, 3 |
| 2 | 192.168.0.6 | 2011-01-01 00:00:20 | 40% | 893MB | 3MB/81KB | 99GB | 2 |
| 3 | 192.168.0.7 | 2011-01-01 00:00:15 | 35% | 1.4GB | 234KB/90KB | 42GB | 4 |

FIG. 7

| JOB EXECUTION-SERVER NUMBER | CPU SPECIFICATION | MEMORY CAPACITY | NETWORK BAND | DISK CAPACITY |
|---|---|---|---|---|
| 1 | Dual Core, 2.66GHz | 4GB | 1Gbps | 80GB |
| 2 | Dual Core, 3.33GHz | 2GB | 100Mps | 160GB |
| 3 | Single Core, 3.33GHz | 4GB | 1Gbps | 320GB |

| JOB NUMBER | EXECUTION TIME | REPEAT EXECUTION | REPEAT INTERVAL | PERMISSIVE FORECAST TIME | CPU OCCUPATION TIME | MEMORY CON-SUMPTION | NETWORK TRAFFIC | DISK CON-SUMPTION |
|---|---|---|---|---|---|---|---|---|
| 1 | 2011-01-01 00:00:00 | true | 10min | 30min | 10s | 10MB | 40KB/80KB | 100KB |
| 2 | 2011-01-01 01:00:00 | true | 1hour | 1hour | 1m | 100KB | 10MB/5MB | 20KB |
| 3 | 2011-01-01 01:00:00~ 2011-01-01 01:10:00 | false | | 5hour | 1hour | 1GB | 1KB/10KB | 1MB |

| EQUATION NUMBER | EXTERNAL INFORMATION ID | FORECASTED EXTERNAL INFORMATION ID | ACQUISITION METHOD | OPERATOR | COMPARISON VALUE | NOTE |
|---|---|---|---|---|---|---|
| EQUATION 1 | http://weather.sample/tokyo/temperature5 | http://weather.sample/tokyo/predict/temperature5 | HTTP | == | TEN MINUTES BEFORE | http-proxy |
| EQUATION 2 | http://weather.sample/tokyo/sunshine1 | http://weather.sample/tokyo/predict/sunshine1 | SQL | != | TEN MINUTES BEFORE | user:password |
| EQUATION 3 | http://energy.sample/energy-price | http://energy.sample/predict/energy-price | SOAP | > | 20 YEN/kWh | EPR |
| EQUATION 4 | http://server.sample/srv-price | http://server.sample/predict/srv-price | SOAP | > | 100 YEN/h | EPR |

FIG. 14

| JOB EXECUTION-SERVER NUMBER | ADDRESS | TIME STAMP | SERVER STATUS | CPU USAGE RATIO | MEMORY CON-SUMPTION | NETWORK TRAFFIC | DISK CON-SUMPTION | JOB NUMBER IN EXECUTING |
|---|---|---|---|---|---|---|---|---|
| 1 | 192.168.0.5 | 2011-01-01 00:00:11 | IN STOPPING | | | | | |
| 2 | 192.168.0.6 | 2011-01-01 00:00:20 | IN OPERATING | 40% | 893MB | 3MB/81KB | 99GB | 2 |
| 3 | 192.168.0.7 | 2011-01-01 00:00:15 | IN OPERATING | 35% | 1.4GB | 234KB/90KB | 42GB | 4 |

FIG. 18

| JOB EXECUTION-SERVER NUMBER | CPU SPECIFICATION | MEMORY CAPACITY | NETWORK BANK | DISK CAPACITY | POWER CONSUMPTION | STOP PERIOD | OPERATION PERIOD |
|---|---|---|---|---|---|---|---|
| 1 | Dual Core, 2.66GHz | 4GB | 1Gbps | 80GB | 500W | 10s | 1m |
| 2 | Dual Core, 3.33GHz | 2GB | 100Mps | 160GB | 400W | 20s | 2m |
| 3 | Single Core, 3.33GHz | 4GB | 1Gbps | 320GB | 600W | 15s | 30s |

APPARATUS AND A METHOD FOR DISTRIBUTING LOAD, AND A NON-TRANSITORY COMPUTER READABLE MEDIUM THEREOF

CROSS-REFERENCE TO RELATED APPLICATION

This application is based upon and claims the benefit of priority from Japanese Patent Application No. 2011-124411, filed on Jun. 2, 2011; the entire contents of which are incorporated herein by reference.

FIELD

Embodiments described herein relate generally to an apparatus and a method for distributing load, and a non-transitory computer readable medium thereof.

BACKGROUND

Recently, a system to provide a plurality of buildings with an energy saving service via a network is well known. The energy saving service mainly operates for medium and minor scaled buildings as a target. In following explanation, the system to provide the energy saving service is called "an energy saving service provision system". The energy service provision system is composed by a plurality of servers.

When types of the energy saving service or the number of buildings to utilize the energy saving service increases, computer resources necessary for a server of this system to execute the energy saving service also increases. Here, "computer resource" means a CPU, a memory, a disk, or a network band of the server in the energy saving service provision system. For an operator of the energy saving service provision system, in order to reduce hardware cost, maintenance cost and electric charges, reduction of the computer resource of the server is important.

In order to reduce the computer cost, smoothing of consumption of the computer resource (Hereinafter, it is called "resource consumption") along time axis is important. In general, the computer resource should be prepared to match with the resource consumption at a peak time. As a result, except for the peak time of the consumption, the computer resource not utilized occurs. Accordingly, if the resource consumption at the peak time can be lowered by smoothing the resource consumption along time axis, the computer resource to be prepared by the energy saving service provision system can be reduced.

As to conventional technique for smoothing the resource consumption, for example, in a load distribution apparatus, by collecting a load status of each server and by transferring an execution program of the energy saving service from a server having high load to another server having low load, smoothing of the load is realized. Here, as to the conventional technique, "load status" means the resource consumption. Accordingly, in a load distribution apparatus thereof, based on information acquired inside the energy saving service provision system, i.e., a load status of the server, smoothing of the load is executed.

However, in the load distribution apparatus thereof, not by using information (related to the energy saving service) outside the energy saving service provision system, smoothing of the load is executed. In other words, an apparatus to smooth the load using external information of the energy saving service provision system does not exist.

BRIEF DESCRIPTION OF THE DRAWINGS

FIG. 2 is a table of job information stored in a meta information storage unit 103 in FIG. 1.
FIG. 3 is a table of execution conditions stored in the meta information storage unit 103.
FIG. 4 is a table of external information decision equations stored in the meta information storage unit 103.
FIG. 5 is a table of resource consumption variation information stored in the meta information storage unit 103.
FIG. 6 is a table of execution time slots stored in an execution time slot storage unit 105 in FIG. 1.
FIG. 7 is a table of information stored in a job execution-server status storage unit 112 in FIG. 1.
FIG. 8 is a table of information stored in a job execution-server specification storage unit 113 in FIG. 1.
FIG. 13 is a table of execution conditions stored in a meta information storage unit 2103 in FIG. 12.
FIG. 14 is a table of external information decision equations stored in the meta information storage unit 2103.
FIG. 18 is a table of information stored in a job execution-server status storage unit 3112 in FIG. 17.
FIG. 19 is a table of information stored in a job execution-server specification storage unit 3113 in FIG. 17.

DETAILED DESCRIPTION

According to one embodiment, a load distribution apparatus includes a receiving unit, an acquisition unit, an estimation unit, and a selection unit. The receiving unit is configured to receive a program of an energy saving service from a service provider. The acquisition unit is configured to acquire an external information related to the energy saving service. The estimation unit is configured to estimate a resource consumption of respective computer resources of a plurality of servers to execute the program based on the external information. The selection unit is configured to select at least one server to be provided with the program from the plurality of servers based on the resource consumption.

Various embodiments will be described hereinafter with reference to the accompanying drawings.

The First Embodiment

Figure 1:
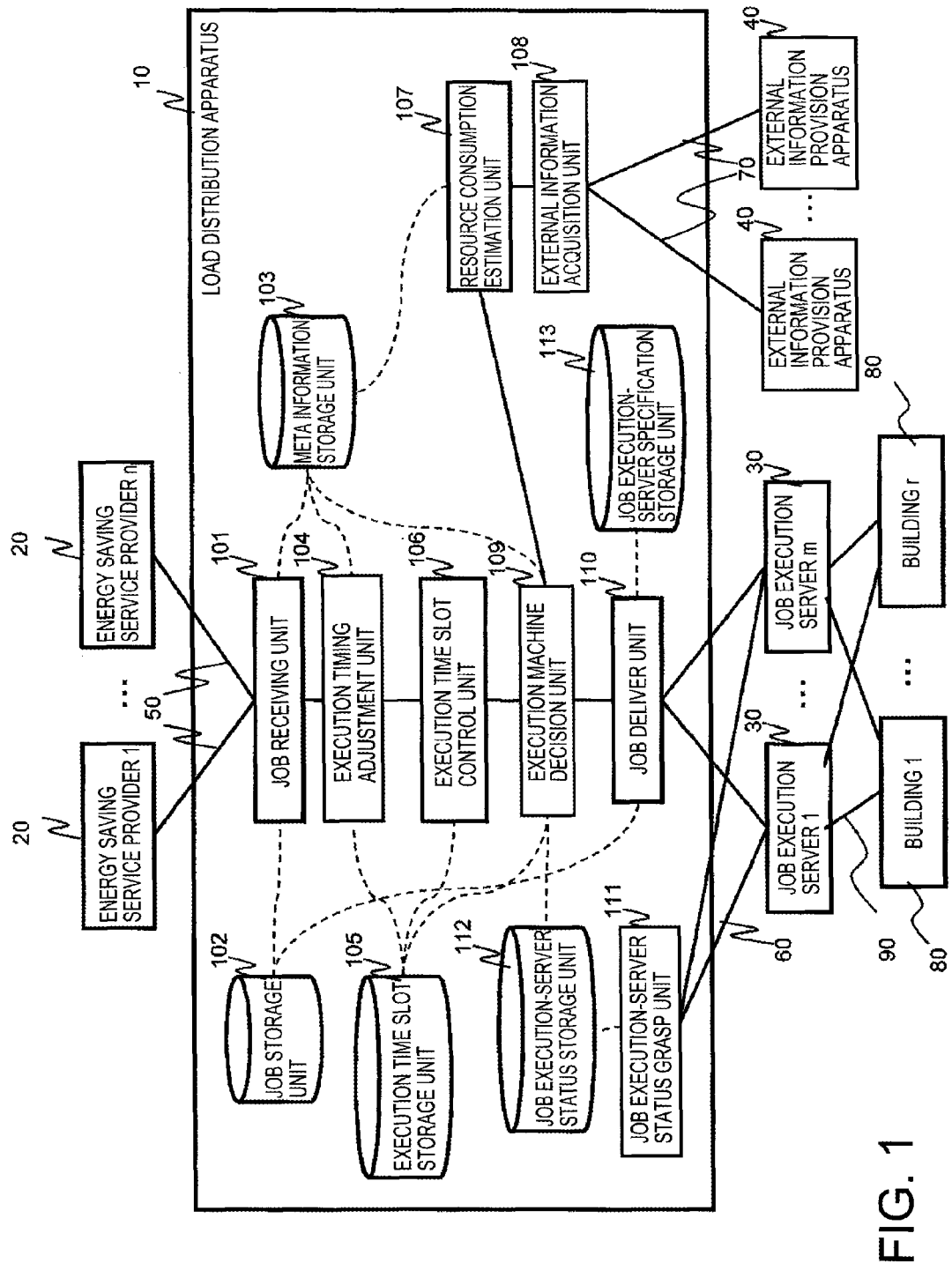
FIG. 1 is a block diagram of a load distribution apparatus 10 according to a first embodiment.

FIG. 1 is a block diagram of a system including a load distribution apparatus 10 according to the first embodiment.
The system of the first embodiment includes a plurality of energy saving service providers 20, a plurality of job execution servers 30, the load distribution apparatus 10, a plurality of external information provision apparatuses 40, and a plurality of buildings 80. The energy saving service provider 20 and the load distribution apparatus 10 are connected via a network 50. The load distribution apparatus 10 and the job execution server 30 are connected via a network 60. The load distribution apparatus 10 and the external information provision apparatus 40 are connected via a network 70. The job execution server 30 and the building 80 are connected via a network 90. In the first embodiment, a system including a plurality of energy saving service providers 20, a plurality of job execution servers 30 and the load distribution apparatus 10, is called the energy saving service provision system.

The energy saving service provider 20 (Hereinafter, it is called a provider 20) provides the load distribution apparatus 10 with an execution program (Hereinafter, it is called a job) of energy saving service via the network 50.

The external information provision apparatus 40 provides the load distribution apparatus 10 with external information via the network 70. Here, the external information is information related to an energy saving service, i.e., information outside the energy saving service provision system.

The load distribution apparatus 10 provides the job execution server 30 with a job provided by the provider. The job is an executable software program of the energy saving service. The result of execution of the job is typically a set value of facilities such as an air conditioner. In this case, by using the external information, the load distribution apparatus 10 selects at least one job execution server to be provided with the job, and provides the selected job execution server therewith.

The job execution server 30 executes the job received from the load distribution apparatus 10. Then, the job execution server 30 provides the building 80 with an energy saving service as an execution result of the job via the network 90.

For example, as the energy saving service, a comfort air conditioning control service and a comfort lighting control service exist. The comfort air conditioning control service is a service to control a set value of an air conditioning device in the building 80 by using a temperature or humidity. This service realizes control of the air conditioning device comfortable for a person and able to save the energy.

The comfort lighting control service is a service to control a luminance or ON/OFF of the lighting device in the building 80 by using a solar radiation. This service realizes control of the lighting device comfortable for a person and able to save the energy.

In the energy saving service such as the comfort air conditioning control service or the comfort lighting control service, a resource consumption of the job execution server 30 to execute a program (job) of the energy saving service varies by the external information (weather information, electric charge, or usage fee of a rental server).

Hereafter, concrete examples of which resource consumption varies by the external information are explained.

For example, in the comfort air conditioning control service, the job execution server 30 executes a periodical operation, and, if a temperature or humidity does not change from a previous operation time, can omit re-operation. Briefly, the resource consumption thereof reduces. In this case, the external information is weather information (temperature or humidity). Moreover, this weather information represents a weather of a region around the air conditioning device of a control target.

Furthermore, in the comfort air conditioning control service and the comfort lighting control service, in order to improve an energy saving effect when the electric charge is expensive, they often operate to increase calculation frequency of the energy saving service. In this case, the resource consumption thereof increases. Briefly, in this service, the resource consumption is in proportion to the electric charge. The external information thereof is the electric charge.

Furthermore, in the energy saving service provision system, when the job execution server 30 is operated using a rental server, a usage fee increases in proportion to the number of servers rent. Accordingly, when the usage fee of the rental server is expensive, in order to operate with a low cost, by operating the fewer number of servers, calculation frequency of job and the resource consumption thereof are reduced. Briefly, when the usage fee of the rental server is expensive, the resource consumption reduces. The external information thereof is the usage fee of the rental server.

As mentioned-above, in the energy saving service, the resource consumption of the job execution server 30 varies by the external information. Accordingly, by calculating the resource consumption with the external information, a job execution server 30 to execute the job execution program is determined based on the resource consumption calculated. As a result, smoothing of the resource consumption in each job execution server 30 and the energy saving service provision system can improve.

Especially, as to weather information, variation timing is different for each region. As to the energy saving service of each building in a plurality of regions, variation timing of the resource consumption thereof is different. Accordingly, smoothing of the resource consumption by using the external information is more effective.

Next, component of the load distribution apparatus 10 is explained by referring to FIG. 1.

A job receiving unit 101 receives a job and meta information from the provider 20. Here, the meta information includes "execution condition", "decision equation of external information" and "variation information of resource consumption". Detail of this information is explained afterwards.

A job storage unit 102 correspondingly stores a job (received by the job receiving unit 101) and a job number to identify the job. A meta information storage unit 103 stores the meta information.

FIG. 2 shows job information. Each item of the job information is explained. In FIG. 2, "job number" is a number to uniquely identify the job, and "type" represents a type of a program of the job. For example, type of program includes an execution binary generated by compiling a program described with C language, a Java® byte code generated by compiling a program described with Java® language, and a script described with interpreter language (such as Bash, Ruby, Perl, PHP) executable without compile.

In FIG. 2, "path" represents a location to store the job in the job storage unit 102. If the job storage unit 102 is a file system, path is a character string to indicate a file to store the job in the file system. Furthermore, if the job storage unit 102 is a memory system, path is a character string to indicate an address to store the job in the memory system.

In FIG. 2, "data" is a data file or a configuration file utilized by the job.

Next, the meta information is explained in order of "execution condition", "decision equation of external information" and "variation information of resource consumption". First, the execution condition is explained.

FIG. 3 is a table showing the execution condition stored in the meta information storage unit 103. The execution condition is information related to execution of the job. Concrete items of the execution condition are explained by referring to FIG. 3.

In FIG. 3, "job number" is a number to uniquely identify the job. The same number as "job number" in FIG. 2 is assigned thereto.

In FIG. 3, "execution time" is a time when a predetermined job is executed. A job to be executed at a specific time and another job to be executed during a predetermined period exist. In FIG. 3, execution times of job numbers 1 and 2 represent a job to be executed at a specific time, and an execution time of job number 3 represents another job to be executed during a predetermined period.

In FIG. 3, "repeat execution" is information representing whether to repeatedly execute the job. Here, "true" represents repeat-execution, and "false" represents non-repeat-execution. Moreover, instead of "true/false", another expression such as "1/0" may be used.

In FIG. 3, "repeat interval" is an interval to execute a job when the job is repeatedly executed, and "CPU occupation time" is a time to occupy a CPU when the job is executed. Moreover, instead of "CPU occupation time", "the number of cycles of CPU" necessary to execute the job may be used.

In FIG. 3, "memory consumption" is a capacity of memory necessary to execute the job, and "network traffic" is a data amount to be transmitted/received when the job is executed. Here, as to the network traffic, data amount to be transmitted and a data amount to be received are respectively shown in FIG. 3 as (data amount to be transmitted)/(data amount to be received).

In FIG. 3, "disk consumption" is a quantity of disk consumed when the job is executed. In this case, a log of execution status of the job and an operation result thereof are often preserved in a disk. Accordingly, a quantity to store in the disk is recorded as "disk consumption".

Here, in the execution condition, information including "CPU occupation time", "memory consumption", "network traffic" and "disk consumption" are defined as "resource consumption". The "resource consumption" is a quantity of the consumed computer resource of a server while the server executes the job. The computer resource is information including a CPU, a memory, a disk or a network band. Here, the memory is a main storage device directly accessible from the CPU, and the disk is an auxiliary memory device directly non-accessible from the CPU. Among the CPU occupation time, the memory consumption, the network traffic and the disk consumption, the resource consumption may be information including all thereof or at least one therein.

As to the execution condition at the first line in FIG. 3, the job number is "1", the job is to be executed at an interval "10 minutes" from "2011-01-01 00:00:02", the CPU occupation time is "10 seconds", the memory consumption is "10 MB", the data amount to be transmitted is "40 MB", the data amount to be received is "80 MB", and the disk consumption is "100 MB".

Next, in the meta information, the second one, i.e., the decision equation of external information is explained. FIG. 4 is a table showing the decision equation stored in the meta information storage unit 103. The decision equation of external information defines a reference that the resource consumption varies. By referring to FIG. 4, concrete items of the decision equation of external information are explained.

In FIG. 4, "equation number" is a number to uniquely identify a decision equation of external information, and "external information ID" is an identifier necessary to acquire external information. In general, the external information such as weather information is often disclosed in Internet as Web service. Furthermore, in the Web service, IDs of various information is represented as URI (Uniform Resource Identifier) format. Accordingly, in FIG. 4, the external information ID is noted as URI format. Here, external information to be used is determined based on the job. For example, if the job is a program to execute a comfort air conditioning service program by controlling an air conditioning device, the external information is weather information in a region around the air conditioning device to be serviced.

In FIG. 4, "acquisition method" is a method to acquire the external information. The acquisition method is matched with the external information provision apparatus 40. For example, the acquisition method is HTTP (Hyper Text Transfer Protocol), SQL, or SOAP.

In FIG. 4, "operator" defines a condition to require an equation and utilized with a comparison value. The "comparison value" defines a condition to require the equation and utilized with the operator.

In FIG. 4, "note" is additional information necessary to acquire the external information. For example, the note is information of HTTP proxy, information of user name and pass word to use for client authentication, or, in case of Web service, information of End Point Reference (EPR).

In FIG. 4, an equation 1 means to require if value of external information identified by "http://weather.sample/tokyo/temperature5" is equal to a value of the external information before ten minutes. An equation 2 means to require if value of external information identified by "http://weather.sample/tokyo/sunshine1" is not equal to a value of the external information before ten minutes. An equation 3 means to require if value of external information identified by "http://energy.sample/energy-price" is larger than 20 yen/1 kWh. As the operator, "larger than or equal to ($>=$)", "smaller than or equal to ($<=$)", or "smaller than ($<$)", may be indicated.

Next, in the meta information, the third information, i.e., the variation information of resource consumption is explained. FIG. 5 is a table showing the variation information of resource consumption stored in the meta information storage unit 103. The variation information of resource consumption represents variation of resource consumption of the job if the decision equation of external information is required (satisfied). By referring to FIG. 5, concrete items of the variation information of resource consumption are explained.

In FIG. 5, "job number" is a number to uniquely identify the job. Here, same number as the job number in FIGS. 3 and 4 is assigned.

In FIG. 5, "required condition" is an equation number of the decision equation of external information to require for variation of the resource consumption. By utilizing "AND" and "OR", a plurality of required conditions may be combined to indicate.

In FIG. 5, "variation of CPU occupation time" is a variation of the CPU occupation time of the job if the required condition is satisfied.

In FIG. 5, "variation of memory consumption" is a variation of the memory consumption of the job if the required condition is satisfied.

In FIG. 5, "variation of network traffic" is a variation of the network traffic of the job if the required condition is satisfied.

In FIG. 5, "variation of disk consumption" is a variation of the disk consumption of the job if the required condition is satisfied.

The resource consumption increases in some case, and decreases in another case. Accordingly, in FIG. 5, a value of each item is represented with plus (+) and minus (−).

For example, in table of FIG. 5, information of the second line means that the resource consumption of job 1 varies when the equation 1 is satisfied. Furthermore, information of the third line means that the resource consumption of job 2 varies when the equations 2 and 3 are satisfied In FIG. 1, an execution timing adjustment unit 104 determines a timing to execute a job received by the job receiving unit 101. The timing to execute the job is stored in an execution time slot storage unit 105. The execution time slot storage unit 105 stores an execution time slot (when, which job is to be executed).

FIG. 6 is a table showing execution time slots stored in the execution time slot storage unit 105. Each line of table in FIG. 6 represents one execution time slot. By referring to FIG. 6, each item of the execution time slot is explained.

In FIG. 6, "time" is a time of the execution time slot. Here, a difference of time between two time slots is fixed. In the first embodiment, the difference is one minute interval.

In FIG. 6, "execution job number" is a job number of a job to be executed at the execution time slot. A plurality of job numbers may be indicated for one execution time slot.

For example, in FIG. 6, the first execution time slot represents, in a period from "2011-01-01 00:00:00" to "2011-01-01 00:01:00", a job of job number 1 is executed.

By periodically referring to the execution time slot storage unit 105, an execution time slot control unit 106 deletes the (old) execution time slot, and adds (new) execution time slot to be executed in future. Because the number of execution time slots prepared in the execution time slot storage unit 105 is limited.

As to the job received by the job receiving unit 101, a resource consumption estimation unit 107 estimates a resource consumption thereof. Before estimating the resource consumption, by referring to meta information, the resource consumption estimation unit 107 accepts external information from the external information provision apparatus 40. Then, by using the external information and the meta information, the resource consumption estimation unit 107 estimates a resource consumption of the job. Detail processing of the resource consumption estimation unit 107 is explained afterwards.

An external information acquisition unit 108 acquires external information from the external information provision apparatus 40, and provides the resource consumption estimation unit 107 with the external information. As an example of the external information provision apparatus 40, a Web server generally disclosed by Japan Meteorological Agency (http://www.jma.go.jp/ja/index.html) or Weather Service (http://www/otenki.co.jp) exists. By using these servers, weather information can be referred. Furthermore, the electric charge or the usage fee of a rental server can be acquired by Web site of an electric power industry or a hosting server business operator.

By periodically referring to execution time slots stored in the execution time slot storage unit 105, an execution machine decision unit 109 determines which job execution server 30 executes a job to be executed at the present timing. Here, an interval for the execution machine decision unit 109 to refer the execution time slots is equal to or shorter than an interval between two execution time slots.

When the execution machine decision unit 109 determines which job execution server 30 executes a job to be executed at the present timing, the execution machine decision unit 109 determines by using a resource consumption (estimated by the resource consumption estimation unit 107), a specification and a usage status of a computer resource of each job execution server 30. Here, the specification and the usage status of the computer resource are grasped by referring to a job execution-server specification storage unit 113 and a job execution-server status storage unit 112. Detail of the specification and the usage status (stored in the job execution-server specification storage unit 113 and the job execution-server status storage unit 112) are explained afterwards. After determines the job execution server 103 to execute the job, the execution machine decision unit 109 notifies a job deliver unit 110 of this decision result.

Based on the decision result from the execution machine decision unit 109, the job deliver unit 110 acquires a job to be executed from the job storage unit 102, and delivers the job to a job execution server 30 to execute the job. The job execution server 30 executes the job accepted. A computer resource of the job execution server 30 is consumed by execution of the job.

A job execution-server status grasp unit 111 collects a consumption status of the computer resource of each job execution server 30, and stores the consumption status into the job execution-server status storage unit 112. As to the consumption status of the computer resource of the job execution server 30, the job execution server status grasp unit 111 may spontaneously collect from each job execution server 30, or may receive information spontaneously notified from the job execution server 30. An interval to collect is equal to or shorter than an interval between two execution time slots.

FIG. 7 is a table showing information stored in the job execution-server status storage unit 112. The job execution-server status storage unit 112 stores a consumption status of the computer resource of each job execution server 30. By referring to FIG. 7, each item stored in the job execution-server status storage unit 112 is explained.

In FIG. 7, "job execution-server number" is an ID to uniquely identify the job execution server, "address" is a communication address of the job execution server, and "time stamp" represents a time corresponding to the stored consumption status of the computer resource.

In FIG. 7, "CPU usage ratio" is a ratio of CPU of the job execution server 30, "memory consumption" is a consumption of a memory of the job execution server 30, "network traffic" is an amount of transmission data and an amount of receiving data of the job execution server 30, "disk consumption" is a consumption of a disk of the job execution server 30, and "job number in executing" is a job number of a job being executed by the job execution server 30. The job number of the job being executed is the same as the job number in FIG. 1.

The job execution-server specification storage unit 113 stores a specification of a computer resource prepared in the job execution server 30. FIG. 8 is a table showing information stored in the job execution-server specification storage unit 113. Hereinafter, each item of information stored in the job execution-server specification storage unit 113 is explained.

In FIG. 8, "job execution-server number" is an ID to uniquely identify the job execution server 30, "CPU specification" is a specification of a CPU prepared in the job execution server 30, "memory capacity" is a capacity of a memory prepared in the job execution server 30, "network band" is a communication performance prepared in the job execution server 30, and "disk capacity" is a capacity of a disk prepared in the job execution server 30.

Next, operation of the load distribution apparatus 10 of the first embodiment is explained by separating into three operations, i.e., "job receiving processing", "execution time slot control", and "job execution processing".

Figure 9:
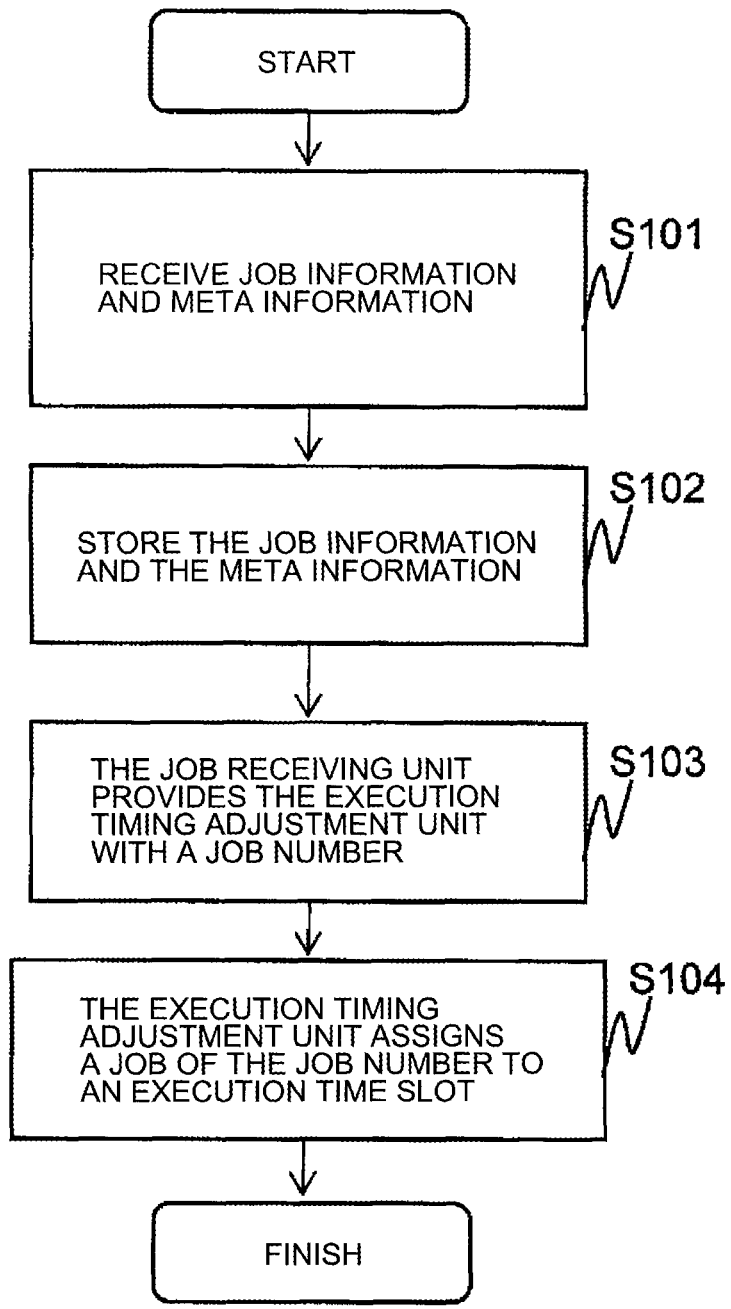
FIG. 9 is a flow chart of job receiving processing by the load distribution apparatus 10.
Figure 10:
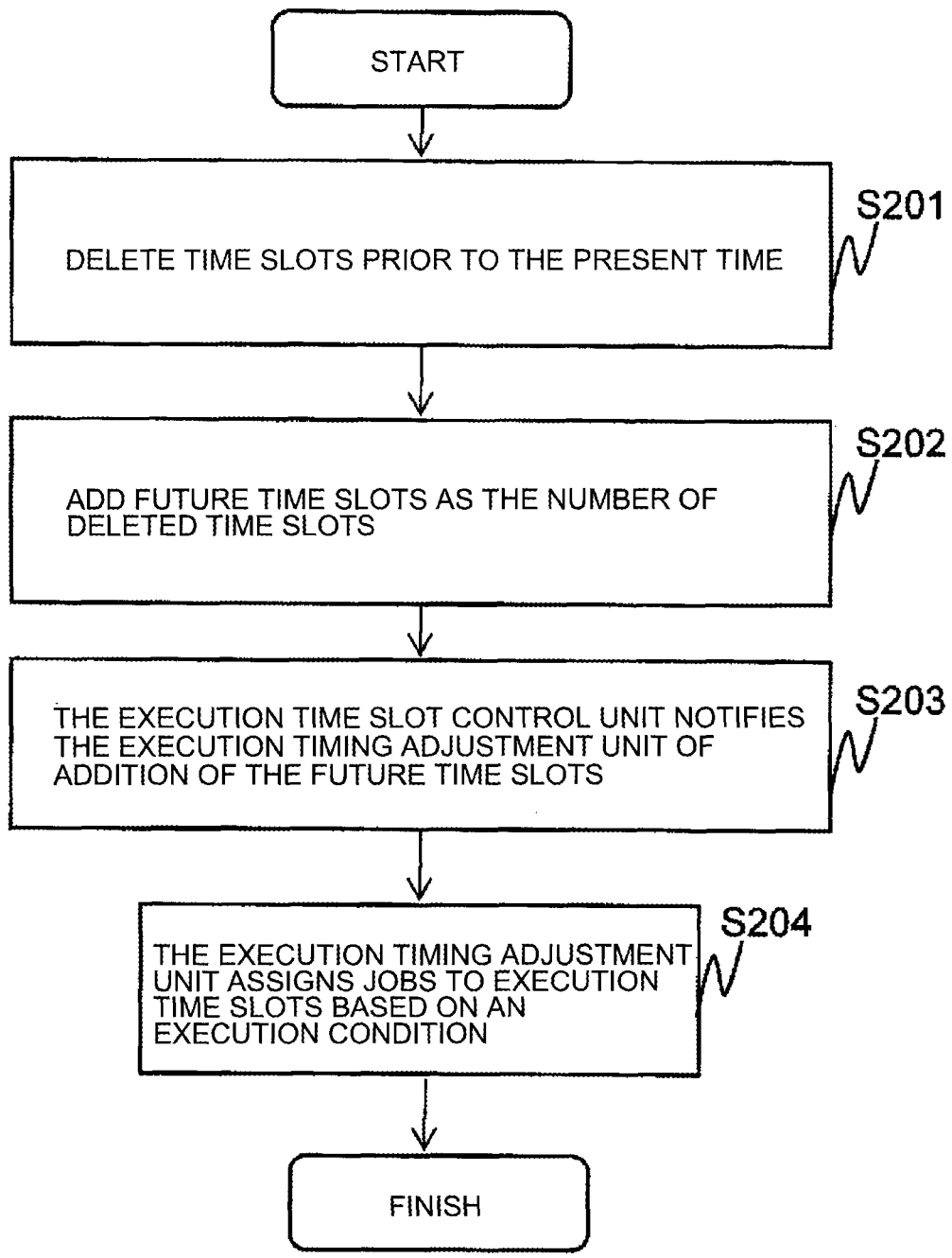
FIG. 10 is a flow chart of processing of execution timeslot control by the load distribution apparatus 10.
Figure 11:
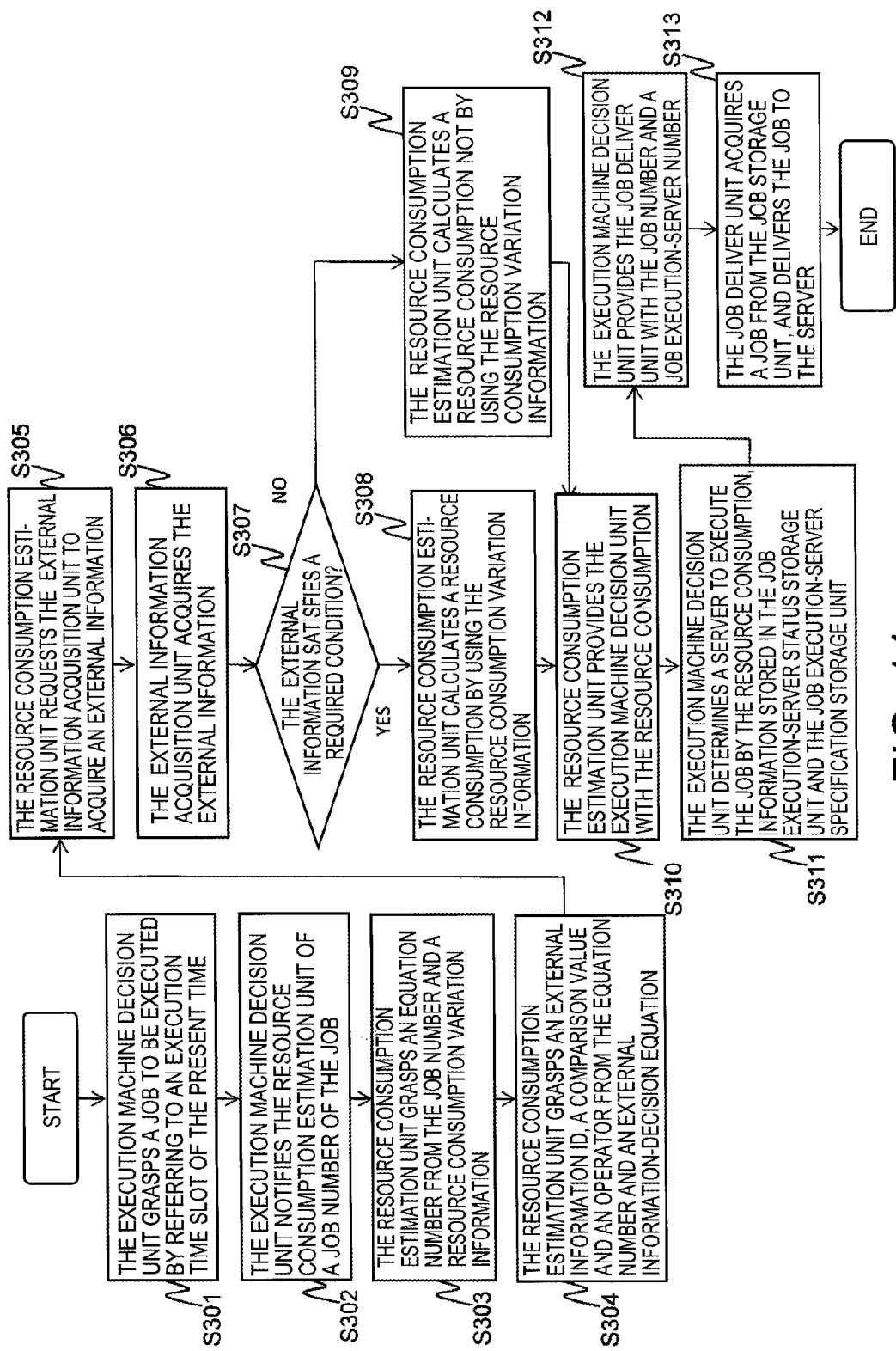
FIG. 11 is a flow chart of job execution processing by the load distribution apparatus 10.

FIG. 9 is a flow chart of job receiving processing of the load distribution apparatus 10. FIG. 10 is a flow chart of execution time slot control of the load distribution apparatus 10. FIG. 11 is a flow chart of job execution processing of the load distribution apparatus 10.

First, by referring to FIG. 9, the job receiving processing of the load distribution apparatus 10 is explained.

First, the job receiving unit 10 receives a job and meta information (execution condition, decision equation of external information, variation information of resource consumption) from the provider 20 (S101).

After receiving the job, the job receiving unit 101 assigns a job number N to uniquely identify the job, and correspondingly stores the job and the job number into the job storage unit 102. Here, "type" of the job information is a file format of the job, and "path" of the job information is a location where the job is stored in the job storage unit 102. The job receiving unit 101 stores the meta information (execution condition, decision equation of external information, variation information of resource consumption) into the meta information storage unit 103 (S102). A job number of the meta information is same as a job number N (N is an integral number larger than or equal to "1") stored in the job storage unit 102.

Next, the job receiving unit 101 provides the execution timing adjustment unit 104 with the job number N (S103).

Next, by referring to the execution condition (FIG. 3) stored in the meta information storage unit 103, based on an execution time and a repeat interval of the execution condition corresponding to the job number N, the execution timing adjustment unit 104 assigns a job to an execution time slot stored in the execution time slot storage unit 105 (S104). For example, in case of "N=1", the job number is 1. In this case, in the execution condition of FIG. 3, the execution time is "2011-01-01 00:00:00". Accordingly, the job number 1 is added to the execution time slot of "2011-01-01 00:00:00" in the execution time slot storage unit 105. Furthermore, in the execution condition of FIG. 3, the repeat interval of the job number 1 is ten minutes. Accordingly, as to execution time slots of "2011-01-01 00:10:00" and "2011-01-01 00:20:00", the job number 1 is added. Thus far, the flow chart of the job receiving processing is already explained.

Next, by referring to FIG. 10, the second operation (the execution time slot control) of the load distribution apparatus 10 is explained.

First, the execution time slot control unit 106 periodically refers execution time slots stored in the execution time slot storage unit 105, and deletes time slots prior to the present time (S201).

Next, the execution time slot control unit 106 adds new time slots (to be executed in future) as the number of deleted time slots (S202).

Next, in response to a notification, by referring to the execution condition (FIG. 3) of each job, the execution timing adjustment unit 104 registers jobs to be assigned to the new time slots to the execution time slot storage unit 105 (S204).

Next, by referring to FIG. 11, the third operation (the job execution processing) of the load distribution apparatus 10 is explained.

First, by referring to the execution time slot storage unit 105, the execution machine decision unit 109 grasps a job number of a job to be executed from an execution time slot corresponding to the present time (S301). For example, if the present time is "2011-01-01 00:00:00", the execution machine decision unit 109 grasps the job number 1 of the job to be executed at the present time in the execution time slot storage unit 105.

Next, the execution machine decision unit 109 notifies the resource consumption estimation unit 107 of the job number (S302), and inquires a resource consumption of the job.

Next, by referring to the variation information (FIG. 5) of resource consumption of the meta information, the resource consumption estimation unit 107 grasps a required condition from the job number (S303). In FIG. 5, if the job number is 1, the resource consumption estimation unit 107 grasps the equation 1 as the required condition.

By referring to the decision equation (FIG. 4) of external information of the meta information, the resource consumption estimation unit 107 acquires information of an equation number of the required condition grasped at S303 (S304). In FIG. 4, if the equation number of the required condition is 1, the resource consumption estimation unit 107 confirms that the external information ID is "http://weather.sample/tokyo/temperature5", the operator is "=", and the comparison value is "ten minutes before".

Next, the resource consumption estimation unit 107 provides the external information acquisition unit 108 with the external information ID and the comparison value, and requests to acquire the external information (S305).

Next, based on the external information ID and the comparison value, the external information acquisition unit 108 acquires the external information (S306). For example, if the external information ID is "http://weather.sample/tokyo/temperature5" and the comparison value is "ten minutes before", the external information acquisition unit 108 acquires information of "http://weather.sample/tokyo/temperature5" corresponding to the present time and ten minutes before. Acquisition of external information is performed by referring to "acquisition method" and "note" of the decision equation (FIG. 4) of external information. The external information acquisition unit 108 provides the resource consumption estimation unit 107 with the external information.

The resource consumption estimation unit 107 decides whether the external information (acquired from the external information acquisition unit 108) satisfies the required condition (S307). In FIG. 4, if the required condition is the equation 1, the operator is "=". Accordingly, when the external information of the present time is same as the external information of ten minutes before, the resource consumption estimation unit 107 decides that the required condition is satisfied. When the external information of the present time is different from the external information of ten minutes before, the resource consumption estimation unit 107 decides that the required condition is not satisfied.

When the required condition is satisfied (Yes at S307), the resource consumption estimation unit 107 estimates a resource consumption of the job, based on a variation of each resource (stored as the variation information (FIG. 5) of resource consumption) and a resource consumption of each resource (stored in the execution condition (FIG. 3)). For example, in case of job number 1, when the equation 1 is satisfied, in FIGS. 3 and 5, the CPU occupation time is estimated as 5 s, the memory consumption is estimated as 7 MB, the network traffic is estimated as 30 KB/40 KB, and the disk consumption is estimated as 50 KB.

Moreover, when the required condition is not satisfied (No at S307), the resource consumption estimation unit 107 estimates a resource consumption of each resource (stored in the execution condition (FIG. 3)) as it is (S309). The resource consumption estimation unit 107 provides the execution machine decision unit 109 with the resource consumption estimated (S310).

By referring to the resource consumption (acquired from the resource consumption estimation unit 107) and information of the job execution-server status storage unit 112, the execution machine decision unit 109 determines a job execution server 30 to execute the job (S311). In this case, various methods for selecting the job execution server 30 can be used. For example, a server having the largest computer resource at the present time may be selected. Furthermore, a server may be selected so that distribution of resource consumption among all servers is minimized.

The execution machine decision unit 109 provides the job deliver unit 110 with a job number of a job to be executed and a server number of the selected server (S312).

Based on the job number, the job deliver unit 110 acquires a job from the job storage unit 102, and delivers the job to a job execution server 30 corresponding to the server number (S313). The job execution server 30 executes the job delivered. When execution of the job is completed, the job execution server 30 replies the execution result to the job deliver unit 110. Thus far, operation of the load distribution apparatus 10 is already explained.

In this way, in the first embodiment, as explained at S305-S311 in FIG. 11, when a resource consumption of a job is calculated, the resource consumption is re-estimated by referring to external information. Accordingly, when the job is executed, the resource consumption thereof can be more correctly grasped. As a result, as a job execution server 30 to execute the job, a more suitable server can be selected. By selecting the suitable server, more smoothing of the resource consumption can be realized. Furthermore, a peak of the resource consumption can be lowered. As a result, a sum of the computer resource to be prepared in the energy saving service provision system can be reduced.

The Second Embodiment

Next, a load distribution apparatus 210 of the second embodiment is explained.

In the load distribution apparatus 10 of the first embodiment, based on the execution time indicated by the execution condition included in the meta information, jobs are assigned to execution time slots.

In the load distribution apparatus 210 of the second embodiment, based on a sum of resource consumption of all jobs assigned to execution time slots, an execution time slot to execute a new job is selected. Concretely, by setting a permissive forecast time of an execution time of a job (with the execution time) to the execution condition included in meta information, an adjustment range of the job execution timing is wider. Furthermore, when the job is executed at a time (except for an execution time of the execution condition) of which difference from the execution time is within the permissive forecast time (Hereinafter, this execution is called "estimation execution"), instead of external information at the execution time, by forecasting external information prior to the execution time, a resource consumption of the job is calculated. Here, if the external information is weather information, forecasted external information is acquired by using weather forecast information. In following explanation, a sum of resource consumption of all job execution servers 30 is represented as "a threshold L".

In the load distribution apparatus 210, for example, when many jobs are assigned to some execution time slot, and if a sum of resource consumption of the jobs is above a sum of resource consumption of all job execution servers 30, by executing the jobs at different timing, a quality of energy saving service can be guaranteed.

Figure 12:
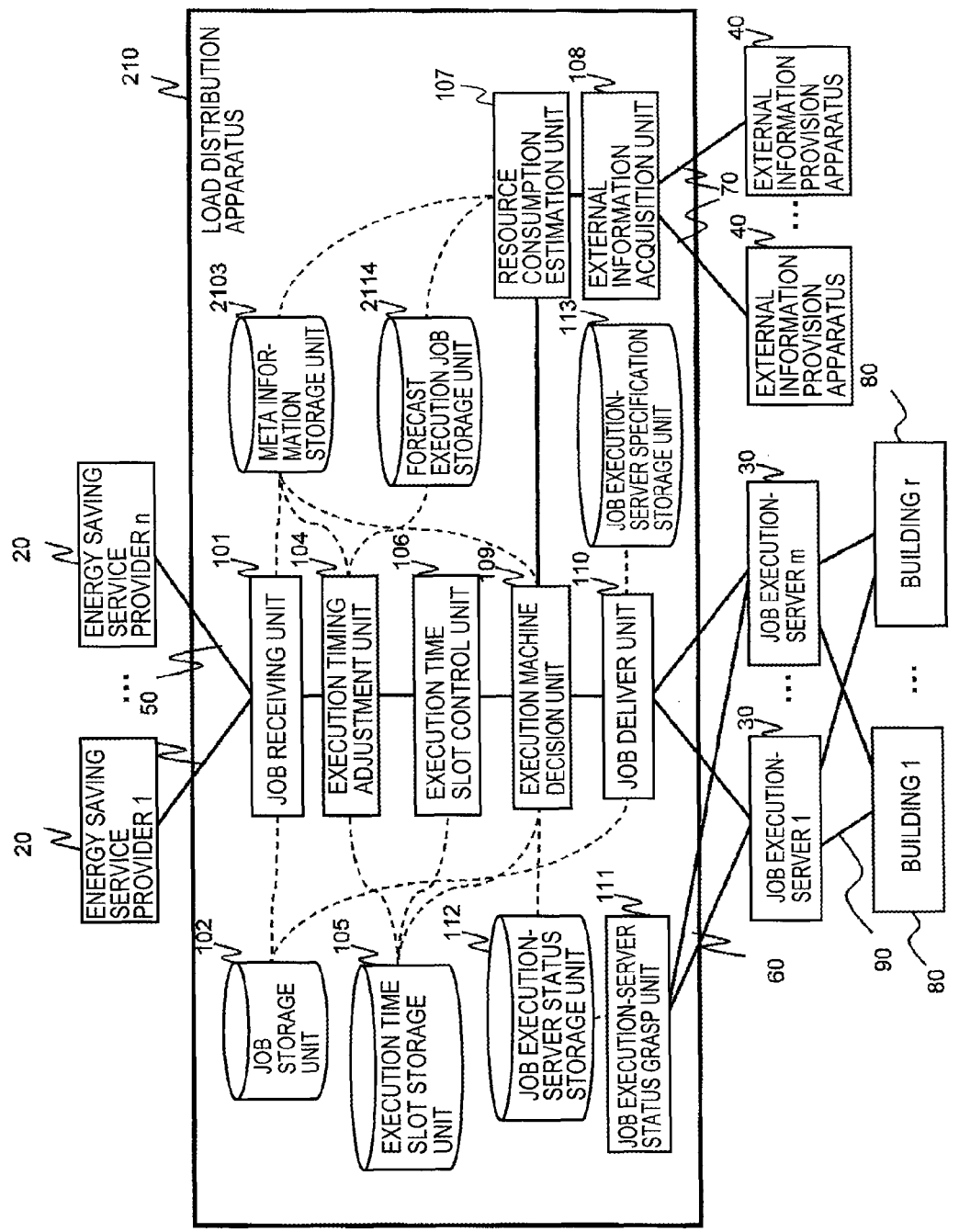
FIG. 12 is a block diagram of a load distribution apparatus 210 according to a second embodiment.

FIG. 12 is a block diagram of a system including the load distribution apparatus 210 of the second embodiment.

The load distribution apparatus 210 includes a forecast execution job storage unit 2114 not included in the load distribution apparatus 10 of the first embodiment. Furthermore, contents of the execution condition and the decision equation of external condition are different from those of the first embodiment.

FIG. 13 shows an execution condition of the second embodiment. In addition to the execution condition of the first embodiment, the execution condition of the second embodiment further stores "permissive forecast time".

The permissive forecast time defines how much future external information can be utilized for each job (Hereinafter, the future external information is called "forecasted external information"). The job can be executed at a time prior to the execution time and within the permissive forecast time.

FIG. 14 shows the decision equation of external information of the second embodiment. In addition to the decision equation of external information of the first embodiment, the decision equation of external information of the second embodiment further stores "forecasted external information ID". This forecasted external information ID is an ID to uniquely identify the forecasted external information.

When the execution timing adjustment unit 104 sets an execution timing of a job to a time (except for an execution time of the execution condition of the job) of which difference from the execution time is within the permissive forecast time, the forecast execution job storage unit 2114 stores a job number of the job.

Figure 15:
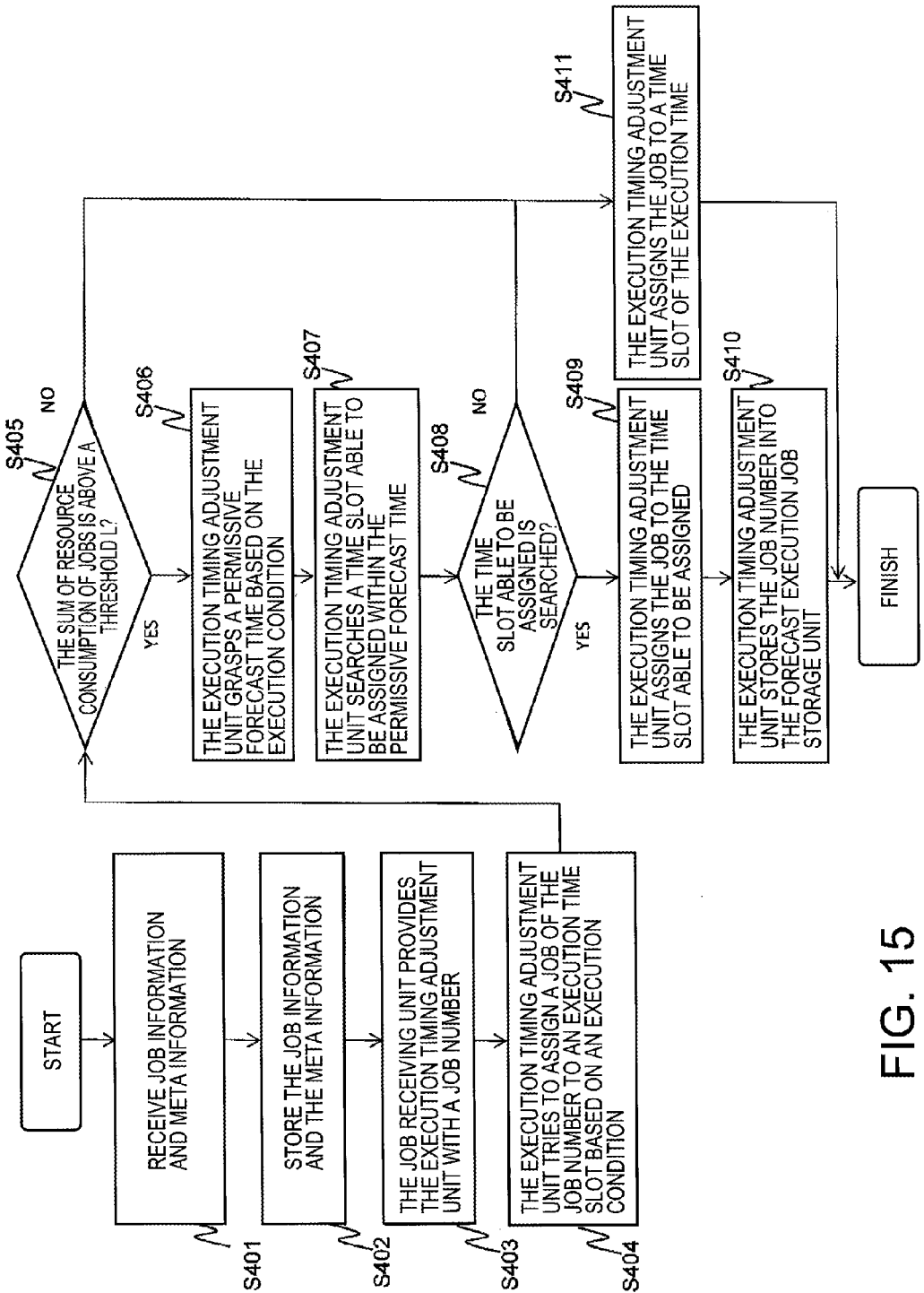
FIG. 15 is a flow chart of job receiving processing by the load distribution apparatus 210.
Figure 16:
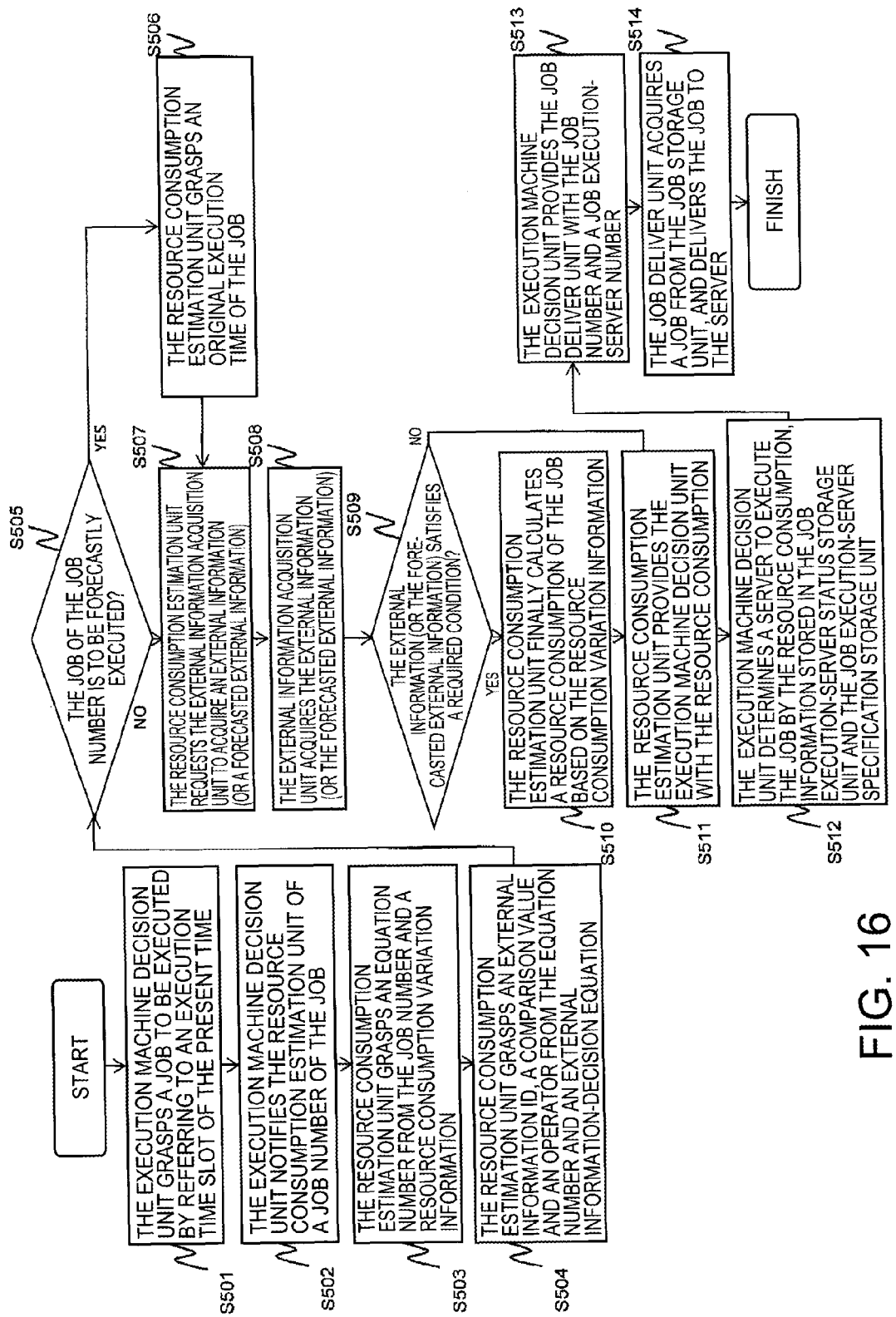
FIG. 16 is a flow chart of job execution processing by the load distribution apparatus 210.

Next, operation of the load distribution apparatus 210 is explained by separating into two operations, i.e., "job receiving processing" and "job execution processing". FIG. 15 is a flow chart of job receiving processing of the load distribution apparatus 210. FIG. 16 is a flow chart of job execution processing of the load distribution apparatus 210.

First, by referring to FIG. 15, the job receiving processing of the load distribution apparatus 210 is explained. In FIG. 15, processing of S401-S403 is same as processing of S101~S103 of FIG. 9. Accordingly, explanation thereof is omitted.

Next, based on the execution time and the repeat interval of the execution condition (FIG. 13), the execution timing adjustment unit 104 tries to newly assign a job to an execution time slot.

Next, the execution timing adjustment unit 104 decides whether a sum of resource consumption of jobs (including the job newly assigned) assigned to the execution time slot is above the threshold L (S405). If the sum is equal to or below the threshold L (No at S405), processing is forwarded to S411. If the sum is above the threshold L (Yes at S405), processing is forwarded to S406.

Next, by referring to the execution condition (FIG. 13) of the job, the execution timing adjustment unit 104 grasps a permissive forecast time (S406).

Next, the execution timing adjustment unit 104 searches execution time slots within the permissive forecast time (S407). For example, as to a job of job number 2 in FIG. 13, the permissive forecast time is one hour. Accordingly, time slots from "2011-01-01 00:00:00" to "2011-01-01 01:00:00".

Next, the execution timing adjustment unit 104 decides whether an execution time slot able to assign the job exists in execution time slots within the permissive forecast time (S408). When the job is assigned to one of the execution time slots within the permissive forecast time, if a sum of resource consumption thereof is not above the threshold L, the execution timing adjustment unit 104 decides that the job can be assigned. If the execution time slot able to assign the job does not exist (No at S408), processing is forwarded to S411.

If the execution time slot able to assign the job exists (Yes at S408), the execution timing adjustment unit 104 assigns the job to the time slot (S409). If a plurality of time slots able to assign the job exists, any of the plurality of time slots is selected. Various methods for selecting can be utilized. For example, a method for selecting a time slot nearest to a time to originally execute the job, or a method for selecting a time slot of which the number of jobs is a minimum, may be used.

Next, the execution timing adjustment unit 104 stores a job number of the job (assigned) into the forecast execution job storage unit 2114 (S410).

Moreover, at S411, the execution timing adjustment unit 104 assigns the job to a time slot of the execution time of the execution condition (FIG. 13).

Thus far, flow chart of the job receiving processing is already explained.

Next, by referring to FIG. 16, operation of the job execution processing of the load distribution apparatus 210 is explained. In FIG. 16, processing of S501-S504 is same as processing of S301~S304 of FIG. 11. Accordingly, explanation thereof is omitted.

Next, by referring to the forecast execution job storage unit 2114, the resource consumption estimation unit 107 decides whether a job of the job number (accepted from the execution machine decision unit 109) is to be forecastly executed (S405). If this job number is stored in the forecast execution job storage unit 2114 (Yes at S505), the resource consumption estimation unit 107 decides that the job is to be forecastly executed. In this case, processing is forwarded to S506. When the resource consumption estimation unit 107 decides that the job is not to be forecastly executed (No at S505), processing is forwarded to S507.

At S506, by referring to the execution condition (FIG. 13) of the job, the resource consumption estimation unit 107 grasps an execution time to originally execute the job (Hereinafter, this execution time is called "time RT").

At S507, the resource consumption estimation unit 107 provides the external information acquisition unit 108 with the external information ID and the comparison value, and requests the external information acquisition unit 108 to acquire the external information. In this case, if the job is forecastly executed, forecasted external information is necessary. Accordingly, the resource consumption estimation unit 107 provides the external information acquisition unit 108 with the forecasted external information ID, the time RT, and the comparison value.

Next, based on the external information ID and the comparison value (provided), the external information acquisition unit 108 acquires external information (S508). In this case, if the estimated external information ID is provided, the external information acquisition unit 108 acquires forecasted external information. For example, if the present time is before ten minutes from the time RT, the forecasted external information corresponding to ten minutes after is acquired. The external information acquisition unit 108 provides the resource consumption estimation unit 107 with the acquired information.

Next, the resource consumption estimation unit 107 decides whether the external information (acquired from the external information acquisition unit 108) satisfies the required condition (S509). If the required condition is the equation 1, the operator is "=". Accordingly, if external information of the present time is same as external information of ten minutes before, the required condition is decided to be satisfied. If not so, the required condition is decided not to be satisfied. Here, when the forecasted external information is acquired, if forecasted external information of the time RT is same as forecasted external information of ten minutes before the time RT, the required condition is decided to be satisfied. If not so, the required condition is decided not to be satisfied.

If the required condition is satisfied (Yes at S509), based on a variation of each resource stored in the variation information of resource consumption and a resource consumption stored in the execution condition, the resource consumption estimation unit 107 finally estimates a resource consumption of the job (S510).

The resource consumption estimation unit 107 provides the execution machine decision unit 109 with the resource consumption finally estimated (S511). When the job is forecastly executed, the resource consumption estimation unit 107 deletes the job number of the job from the forecast execution job storage unit 2114.

In FIG. 16, processing of S512~S514 is same as processing of S310~S314 of FIG. 11. Accordingly, explanation thereof is omitted.

As mentioned-above, in the load distribution apparatus 210 of the second embodiment, based on a sum of resource consumption of jobs assigned to the execution time slot, a timing to execute at least one of the jobs can be shifted. Accordingly, it is prevented that jobs are concentrically assigned to a specific time slot. As a result, consumption of computer resources can be smoothed.

Moreover, in the second embodiment, the threshold L is a sum of resource consumption of all job execution servers. However, the threshold L may be a value below the sum of resource consumption thereof. By this value, a peak of a sum of resource consumption of the energy saving service provision system can be lowered. As a result, the computer resource of all the system can be reduced.

Moreover, if the forecasted external information is not actually correct, processing to cope with this case can be executed.

For example, the resource consumption estimation unit 107 preserves the forecasted external information (of a job to be forecately executed) without deletion until time RT. At the time RT, by comparing the forecasted external information with actual external information of the time RT, the resource consumption estimation unit 107 decides whether the forecasted external information is same as the actual external information. If the forecasted external information is not same as the actual external information, the resource consumption estimation unit 107 notifies the execution machine decision unit 109 of the job. Accordingly, if the forecasted external information is not actually correct, the job can be executed again.

Concretely, the resource consumption estimation unit 107 compares the forecasted external information with external information acquired at time RT. If the forecasted external information is different from the external information, the resource consumption estimation unit 107 re-estimates a resource consumption of computer resource of the job execution server 30 to execute the job by using the external information. Then, based on the resource consumption re-estimated, the execution machine decision unit 109 selects a server to execute the job from all job execution servers 30. Then, the job deliver unit 110 delivers the job to the server selected by the execution machine decision unit 109 again.

The Third Embodiment

Next, a load distribution apparatus 310 of the third embodiment is explained.

In the energy saving service provision system including a plurality of servers, in comparison with the case that many servers respectively execute a little calculation, in the case that few servers respectively execute a large calculation while other servers are stopping, a power consumption of all the system becomes smaller. Here, "stop" represents shut down, suspend, or sleep of the server.

In the load distribution apparatus 310 of the third embodiment, when a resource consumption of a job to be executed is smaller than a sum of computer resources of all job execution servers 30, by stopping a part of all job execution servers 30, a power consumption of all the system can be suppressed. This feature is different from the load distribution apparatus of the first and second embodiments.

Figure 17:
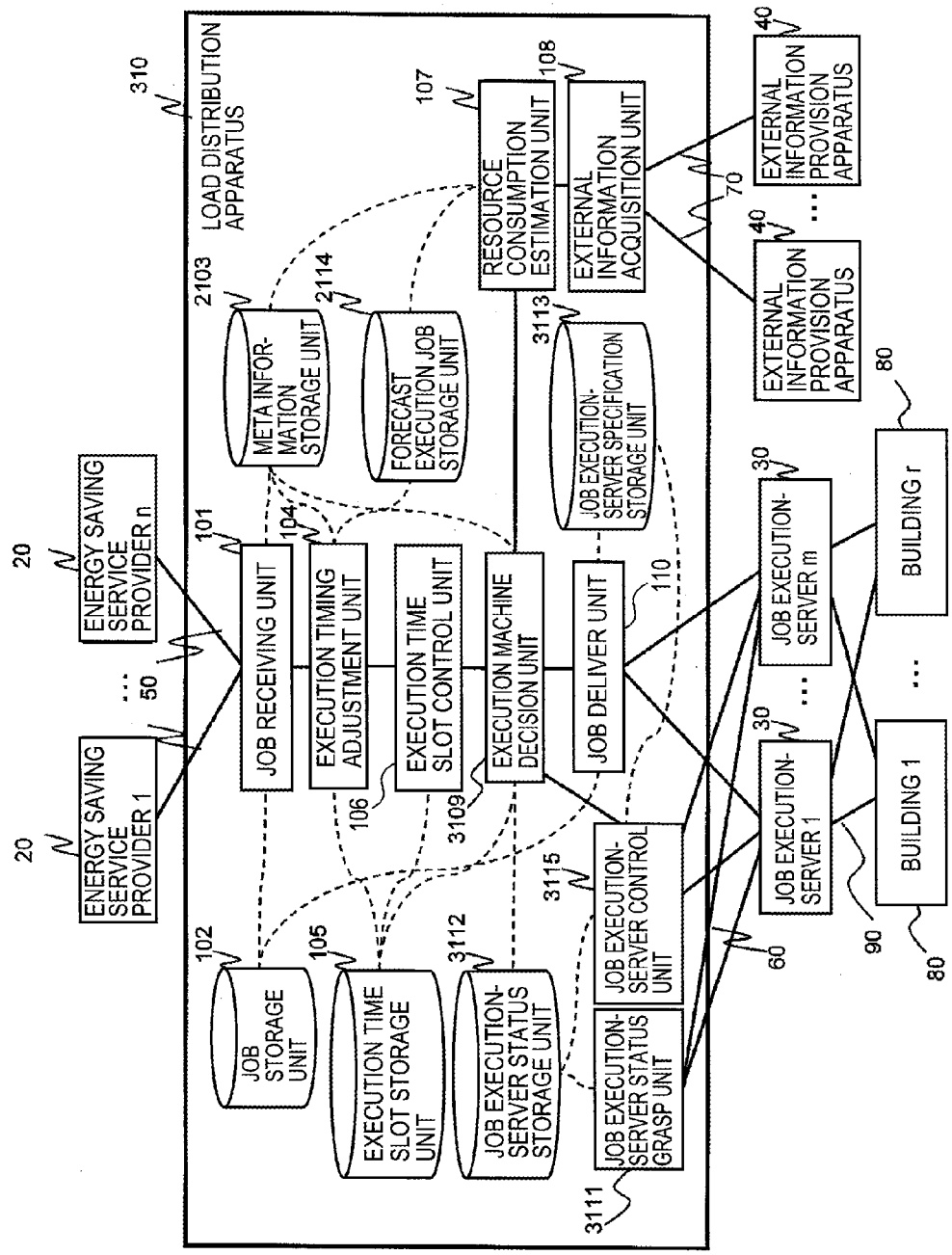
FIG. 17 is a block diagram of a load distribution apparatus 310 according to a third embodiment.

FIG. 17 is a block diagram of the load distribution apparatus 310 of the third embodiment. In addition to component of the load distribution apparatus 210 of the second embodiment, the loads distribution apparatus 310 of the third embodiment includes a job execution-server control unit 3115.

In response to a notification from the execution machine decision unit 3109, the job execution server control unit 3115 executes stop processing and start processing of the job execution server 30. For example, the stop processing can be executed via a remote log-in program such as ssh (secure socket shell). Furthermore, the start processing can be executed by remote activation technique such as WOL (wake On LAN).

FIG. 18 shows information stored in a job execution-server status storage unit 3112 of the third embodiment. In addition to information stored in the job execution-server status storage unit 112, the job execution-server status storage unit 3112 stores "server status". The server status is information representing whether the job execution server 30 is being stopping or operating.

In comparison with function of the execution machine decision unit 109, the execution machine decision unit 3109 determines the job execution server 30 to execute the job by excluding job execution servers 30 of which server status is "in stopping", which is different feature.

In comparison with function of the job execution-server status grasp unit 111, the job execution-server status grasp unit 3111 determines the server status by deciding whether to communicate with the job execution server 30, which is different feature.

FIG. 19 shows information stored in a job execution-server specification storage unit 3113 of the third embodiment. In comparison with the job execution-server specification storage unit 113, the job execution-server specification storage unit 3113 further stores "power consumption", "stop period" and "operation period". The power consumption is a power consumed by the job execution server 30. The stop period and the operation period are respectively a period required for stop processing and start processing of the job execution server 30.

Figure 20:
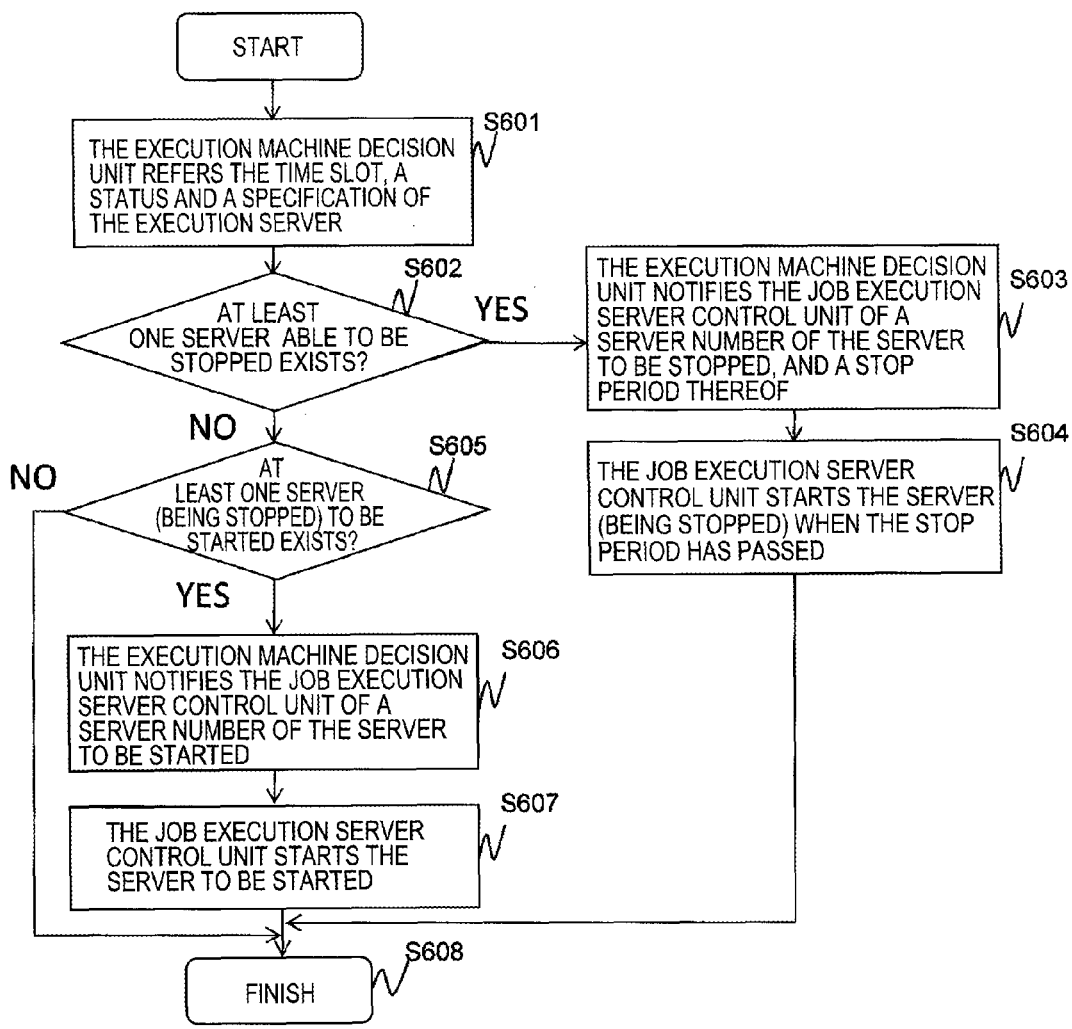
FIG. 20 is a flow chart of processing to stop and start a server by the load distribution apparatus 310.

Next, operation of the load distribution apparatus 310 is explained. FIG. 20 is a flow chart of processing to stop and start the job execution server 30.

In addition to job execution processing explained in the first embodiment, the execution machine decision unit 3109 executes processing of FIG. 20.

First, the execution machine decision unit 3109 refers the execution time slot storage unit 105, the job execution-server status storage unit 3112, and the job execution-server specification storage unit 3113 (S601).

Next, the execution machine decision unit 3109 decides whether at least one job execution server 30 able to be stopped exists (S602). Detail of decision processing is explained afterwards. Furthermore, a method for calculating the stop period of the job execution server 30 is explained afterwards.

If the server able to be stopped exists (Yes at S602), the execution machine decision unit 3109 notifies the job execution server control unit 3115 of a server number of the job execution server 30 to be stopped, and a stop period thereof (S603). Hereafter, until the saver status of this job execution server 30 becomes "in operating", the execution machine decision unit 3109 does not make this job execution server 30 execute the job.

The job execution server control unit 3115 stops the job execution server 30 notified. However, while the job execution server 30 to be stopped is executing some job, the job execution server control unit 3115 does not stop this job execution server 30. Furthermore, when the stop period of the job execution server 30 has passed, the job execution server control unit 3115 makes the job execution server 30 start (S604).

At S605, the execution machine decision unit 3109 decides whether to make the job execution server 30 (being stopped) start. Normally, at S604, the job execution server 30 (being stopped) is started (activated) after the stop period has passed. However, by newly inputting a job from the provider 20, a resource consumption of the job may suddenly increase. Accordingly, urgent start of the server is decided (S605). A method for deciding the urgent start is explained afterwards. If at least one server (being stopped) to be started exists (Yes at S605), the execution machine decision unit 3109 notifies the job execution server control unit 3115 of a server number of the at least one server 30 (S606).

The job execution server control unit 3115 starts (activates) the job execution server 30 notified (S607). Thus far, the stop processing and the start processing of the job execution server 30 are already explained.

Next, among the stop processing and the start processing of the job execution server 30, processing of S602 to decide whether the job execution server 30 able to be stopped exists is explained in detail. Furthermore, a method for calculating a stop period thereof is also explained.

In order to decide whether the job execution server 30 able to be stopped exists, as to each job execution server 30 being operating (each server 30 is represented as $S\_1$ , , , $S\_i$ , , , $S\_n$), the execution machine decision unit 3109 performs following calculation.

First, even if $S\_i$ is stopped, it is decided whether all jobs can be processed. If a sum of computer resources of job execution servers 30 (being operating) except for $S\_i$ is larger than a sum of resource consumptions of all jobs assigned to a time slot of the present time, the execution machine decision unit 3109 decides that all jobs can be processed even if $S\_i$ is stopped.

In the same way, as to jobs assigned to time slots aligned after the time slot of the present time, the execution machine decision unit 3109 decides whether all jobs can be processed even if $S\_i$ is stopped.

A difference $D\_i$ between a time of time slot decided that all jobs cannot be processed and a time of the present time slot is set to a period to stop $S\_i$.

By referring to the job execution-server specification storage unit 3113 (FIG. 19), if a total $T\_i$ of the stop period and the operation period of $S\_i$ is shorter than $D\_i$, the execution machine decision unit 3109 decides that $S\_i$ is a server able to be stopped.

Next, the execution machine decision unit 3109 calculates a deletion amount $W\_i$ of power consumption acquired by stopping $S\_i$. The deletion amount $W\_i$ can be calculated by multiplying a power consumption (stored in the job execution-server specification storage unit 3113) with $D\_i$.

As to all servers $S\_1$ , , , $S\_i$ , , , $S\_n$, by executing the same processing as $S\_i$, the execution machine decision unit 3109 selects a server able to be stopped. If a plurality of servers able to be stopped exists, for example, a server having the largest W_i may be selected. According to the case, a plurality of servers may be stopped.

Next, processing of S605 in FIG. 20 is explained in detail. By newly inputting a job from the provider 20, as to whether to start the job execution server 30 being stopped, the execution machine decision unit 3109 decides by following calculation.

First, as to all jobs to be executed at a time slot of the present time, a sum of resource consumptions thereof is calculated (step 1).

Next, if a sum of computer resources of job execution servers 30 (being operating) is smaller than a sum of resource consumptions of the all jobs, the job execution server 30 is started (activated). In this case, the job execution server 30 is selected so that the sum of computer resources of job execution servers 30 (being operating) is larger than the sum of resource consumptions of the all jobs (step 2).

It takes several seconds~several minutes to start the job execution server 30. Accordingly, the steps 1 and 2 are performed to not only the present time slot but also time slots in future of several minutes from the present time. A future period (several minutes) of time slots to perform the steps 1 and 2 may be a fixed value by a configuration file, or matched with a maximum of the start period by referring to the job execution-server specification storage unit 3113.

As mentioned-above, in the load distribution apparatus 310, when the number of jobs to be executed is few, by stopping at least one server 30, the power consumption of the energy saving provision system can be suppressed.

According to at least one of the first, second and third embodiments, by using external information (such as weather information, electric charge) acquired from outside of the energy saving service provision system, variation of resource consumption of the energy saving service is calculated. As a result, while the energy saving service is operating, the resource consumption can be smoothed.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus comprising:
a receiving unit configured to receive a program of an energy saving service from a service provider;
an acquisition unit configured to acquire external information related to the energy saving service;
an estimation unit configured to estimate a resource consumption of respective computer resources of a plurality of servers to execute the program, based on the external information; and
a selection unit configured to select at least one server to be provided with the program from the plurality of servers, based on the resource consumption; wherein
the receiving unit further receives meta information from the service provider, the meta information including a second resource consumption and a variation, the second resource consumption of the respective computer resources of the plurality of servers to execute the program comprising an estimate from the service provider, the variation being an amount that the second resource consumption varies when the external information satisfies a specific condition, and
the estimation unit estimates a sum of the second resource consumption and the variation as the resource consumption when the external information satisfies the specific condition.

2. The apparatus according to claim 1, further comprising:
a deliver unit configured to provide the at least one server with the program.

3. The apparatus according to claim 2, wherein
the receiving unit further receives meta information from the service provider, the meta information including an execution time and a permissive forecast time, the execution time being a time when the server executes the program, the permissive forecast time being a period in which the execution time is changeable, and
the apparatus further comprising:
an execution timing adjustment unit configured to decide, when the resource consumption to execute the program corresponding to the execution time is above a threshold, that the program is to be executed within the permissive forecast time prior to the execution time; wherein
the acquisition unit acquires a forecasted external information as a forecasted value of the external information of the execution time when the program is to be executed within the permissive forecast time prior to the execution time,
the estimation unit estimates a third resource consumption of the respective computer resources of the plurality of servers to execute the program, based on the forecasted external information, and the selection unit selects at least one server to be provided with the program from the plurality of servers, based on the third resource consumption.

4. The apparatus according to claim 3, wherein
when the forecasted external information is different from the external information of the execution time,
the estimation unit estimates the resource consumption based on the external information,
the selection unit selects at least one server to be provided with the program, based on the resource consumption, and
the deliver unit provides the at least one server with the program again.

5. The apparatus according to claim 1, further comprising:
a second acquisition unit configured to acquire a consumption status of the respective computer resources of the plurality of servers; and
a specification storage unit configured to store a specification of the computer resource of the plurality of servers;
wherein the selection unit selects the at least one server based on the resource consumption, the consumption status and the specification.

6. The apparatus according to claim 1, wherein
the computer resource includes at least one of a CPU, a main storage device, an auxiliary storage device, and a network band, and
the resource consumption includes at least one of an occupation time of the CPU, the number of cycles of the CPU, a consumption of the main storage device, a consumption of the auxiliary storage device, and a traffic of the network band.

7. The apparatus according to claim 1, wherein
the energy saving service comprises a service to calculate a configuration value of an air conditioning device,
the external information comprises weather information of a region around the air conditioning device,
the program comprises operations to calculate the configuration value, and
the specific condition comprises whether weather information of a first time and weather information of a second time prior to the first time satisfy a specific relationship.

8. The apparatus according to claim 1, further comprising:
an execution time slot storage unit configured to store a correspondence relationship between a time and the program to be executed at the time;
a specification storage unit configured to store a specification of the respective computer resources of the plurality of servers; and
a server control unit configured to stop at least one of servers being operating, based on the resource consumption to execute the program of the present time stored in the execution time slot storage unit, and the specification of the servers stored in the specification storage unit.

9. A method comprising:
receiving a program of an energy saving service from a service provider;
acquiring an external information related to the energy saving service;
estimating a resource consumption of respective computer resources of a plurality of servers to execute the program, based on the external information; and
selecting at least one server to be provided with the program from the plurality of servers, based on the resource consumption; wherein
the receiving includes
receiving meta information from the service provider, the meta information including a second resource consumption and a variation, the second resource consumption of the respective computer resources of the plurality of servers to execute the program comprises an estimate from the service provider, the variation being an amount that the second resource consumption varies when the external information satisfies a specific condition, and
the estimating includes
estimating a sum of the second resource consumption and the variation as the resource consumption when the external information satisfies the specific condition.

10. A non-transitory computer readable medium for causing a computer to perform operations comprising:
receiving a program of an energy saving service from a service provider;
acquiring an external information related to the energy saving service;
estimating a resource consumption of respective computer resources of a plurality of servers to execute the program, based on the external information; and
selecting at least one server to be provided with the program from the plurality of servers, based on the resource consumption; wherein
the receiving includes
receiving meta information from the service provider, the meta information including a second resource consumption and a variation, the second resource consumption of the respective computer resources of the plurality of servers to execute the program comprising an estimate by the service provider, the variation being an amount that the second resource consumption varies when the external information satisfies a specific condition, and
the estimating includes
estimating a sum of the second resource consumption and the variation as the resource consumption when the external information satisfies the specific condition.

* * * * *